United States Patent [19]
Nishimura

[11] Patent Number: 5,667,474
[45] Date of Patent: Sep. 16, 1997

[54] VISIBLE AND INFRARED IMAGING APPARATUS WITH MOVEMENT DETECTING CIRCUITS FOR AFFECTING FREEZE AND NOISE REDUCING OPERATIONS

[75] Inventor: Shigeru Nishimura, Omiya, Japan

[73] Assignee: Fuji Photo Optical Co., Ltd., Saitama, Japan

[21] Appl. No.: 399,461

[22] Filed: Mar. 7, 1995

[30] Foreign Application Priority Data

Mar. 9, 1994 [JP] Japan .................. 6-067626

[51] Int. Cl.$^6$ .................................... A61B 1/045
[52] U.S. Cl. .................. 600/109; 600/921; 600/160; 348/70; 348/620
[58] Field of Search .................. 600/921, 109, 600/178, 160, 181; 128/664; 348/68–71, 131, 164, 155, 220–221, 270, 272, 273, 620

[56] References Cited

U.S. PATENT DOCUMENTS

| | | | |
|---|---|---|---|
| 4,367,490 | 1/1983 | Riederer | 348/620 |
| 4,882,619 | 11/1989 | Hasegawa et al. | 600/181 |
| 5,161,018 | 11/1992 | Matsunaga | 348/620 |
| 5,164,824 | 11/1992 | Ieoka et al. | 600/109 |

FOREIGN PATENT DOCUMENTS 2-49302  8/1988  Japan .

*Primary Examiner*—Richard J. Apley
*Assistant Examiner*—John P. Leubecker
*Attorney, Agent, or Firm*—Townsend & Banta

[57] ABSTRACT

A field sequential image pickup apparatus which prevents misregistration in color pictures with respect to a visible freeze image and improves the S/N of an infrared image with respect to a movement of an object of observation. R (red), G (green), B (blue) and infrared light beams are sequentially projected from a color disk provided with filters for visible light and a filter for infrared light, and a CCD sequentially generates R, G, B picture signals and infrared picture signals. A movement detection circuit detects a movement in the object from the picture signals. When there is a movement, a freeze operation is inhibited with respect to a visible image, while executing it when there is no movement. With respect to an infrared image, a noise reducing operation is suppressed when there is a movement, while fully executing it when there is no movement.

3 Claims, 2 Drawing Sheets

FIG. 2
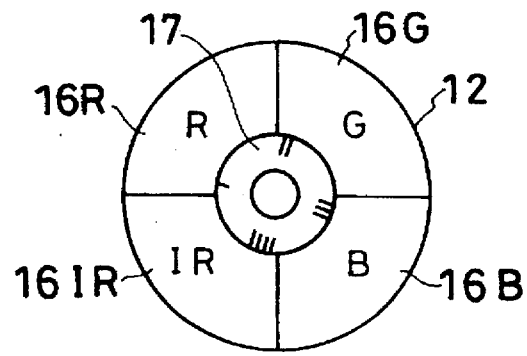
FIG. 3

VISIBLE AND INFRARED IMAGING
APPARATUS WITH MOVEMENT
DETECTING CIRCUITS FOR AFFECTING
FREEZE AND NOISE REDUCING
OPERATIONS

BACKGROUND OF THE INVENTION

This application claims the priority of Japanese Patent Application No. 6-67626 filed on Mar. 9, 1994.

1. Field of the Invention

The present invention relates to a field sequential image pickup apparatus and, more particularly, to the structure of a circuit which is used for a field sequential electronic endoscope apparatus or the like so as to process an image while taking a movement in an object of observation into consideration.

2. Description of the Related Art

As an image pickup apparatus, there is an electronic endoscope for observing a body cavity such as an alimentary canal by using a CCD (Charge Coupled Device) as a solid-state image pickup device. In some of such field sequential apparatuses, not only a visible image is formed by R (red), G (green) and B (blue) light but also an infrared image is formed by infrared light (e.g. near infrared light). According to these apparatuses, it is possible to simultaneously observe an ordinary color picture and a cortical portion or submucous blood flow in a body cavity with infrared light. When an image of the object of observation is displayed on a monitor, it is also possible to display a freeze (still) image by operating a freeze button or the like. That is, a desired still image is displayed on a monitor by pressing a freeze button in accordance with a freeze command issued under the control of the reading operation of the picture signals sequentially stored in a memory. Owing to such a freeze image, detailed observation of an object is enabled, and it is possible to record the freeze image in the form of a photograph and a video image.

Such a sequential image pickup apparatus, however, suffers from a problem that when there is a movement in an object of observation, there is misregistration in color images. In a visible image, RGB light beams are sequentially projected through a color (filter) disks so as to form RGB picture signals, and these RGB picture signals are mixed and simultaneously processed. Therefore, when there is a movement of an object of observation, a positional difference is caused among RGB signals, which are obtained in time series, in correspondence with a difference in the moving speed, which results in misregistration in color images. To prevent this, in a conventional apparatus, a movement at an object of observation is detected so as to inhibit a freezing operation when there is a movement, while executing a freezing operation when there is no movement.

In an infrared image, however, a monochromatic image is displayed, so that there is no problem in misregistration in color images. In other words, there is no necessity of controlling a freezing operation in accordance with the movement of an object of observation. On the contrary, it is expected to display and record a freeze image, at the point of time which is the optimum for observation without missing a shutter chance when there is a movement in an object of observation. In contrast, where there is no movement, it is necessary to display as clear an image as possible with an improved S/N.

SUMMARY OF THE INVENTION

Accordingly, it is an object of the present invention to eliminate the above-described problems in the related art and to provide a field sequential image pickup apparatus which is capable of preventing misregistration in visible color images, which is capable of displaying a freeze infrared image irrespective of a movement of an object of observation and, in addition, which is capable of displaying a clear infrared image.

To achieve this end, in one aspect of the present invention, there is provided a field sequential image pickup apparatus comprising: a light source device provided with a color disk which has filters for visible light and a filter for infrared light (near infrared light or far infrared light); a signal processing circuit for sequentially generating visible picture signals and infrared picture signals from a solid-state image sensor in synchronism with the rotation of each filter; a movement detection circuit for detecting a movement of an object of observation from the picture signals supplied from the signal processing circuit; a freeze operation circuit for executing a freeze operation with respect to the visible picture signals in accordance with a movement of the object; and a noise reducing circuit for executing a noise reducing operation with respect to the infrared picture signals in accordance with a movement of the object.

The freeze operation circuit inhibits a freeze operation when a movement of an object is detected by the movement detection circuit, while executing a freeze operation when no movement is detected. The noise reducing circuit suppresses a noise reducing operation when a movement of an object is detected by the movement detection circuit, while fully executing a noise reducing operation when no movement is detected.

In another aspect of the present invention, there is provided a field sequential image pickup apparatus comprising: a light source device including a color disk provided with filters for visible light and a filter for infrared light so as to sequentially output visible light and infrared light by a rotating operation, and a detection sensor for detecting a rotation of the color disk; a solid-state image sensor for picking up an image of a body cavity as an object of observation at the time of projection of the visible light and the infrared light; a gate pulse generating circuit for generating gate pulses for extracting visible picture signals and infrared picture signals on the basis of the outputs of the detection sensor; a signal separation circuit for separating the visible picture signals and the infrared picture signals from the outputs of the solid-state image sensor on the basis of the gate pulses output from the gate pulse generating circuit; a movement detection circuit for detecting a movement of the object of observation from the picture signals output from the signal separation circuit; a freeze operation circuit for inhibiting a freeze operation with respect to the visible picture signals if a movement of the object is detected by the movement detecting circuit, while executing a freeze operation if no movement is detected when a freeze command is issued; and a noise reducing circuit for suppressing a noise reducing operation when a movement of an object is detected by the movement detection circuit, while fully executing a noise reducing operation when no movement is detected.

According to this structure, one turn of the color disk produces a picture for four fields, e.g., a picture of R signal, G signal, B signal and infrared signal. When a movement of the object of observation is detected by the movement detection circuit, a freeze operation is inhibited with respect to the visible image, and the noise reducing operation is suppressed with respect to the infrared image. In this manner, with respect to an infrared image, it is possible to obtain a freeze image even if there is a movement in the object of observation, and when there is no movement, it is possible to obtain a clear picture with reduced noise.

The above and other objects, features and advantages of the present invention will become clear from the following description of the preferred embodiment thereof, taken in conjunction with the accompanying drawings.

BRIEF DESCRIPTION OF THE DRAWINGS

FIG. 2 shows the structure of a color disk; and

FIG. 3 shows the waveforms explaining the operations of the embodiment.

DESCRIPTION OF THE PREFERRED EMBODIMENT

Figure 1:
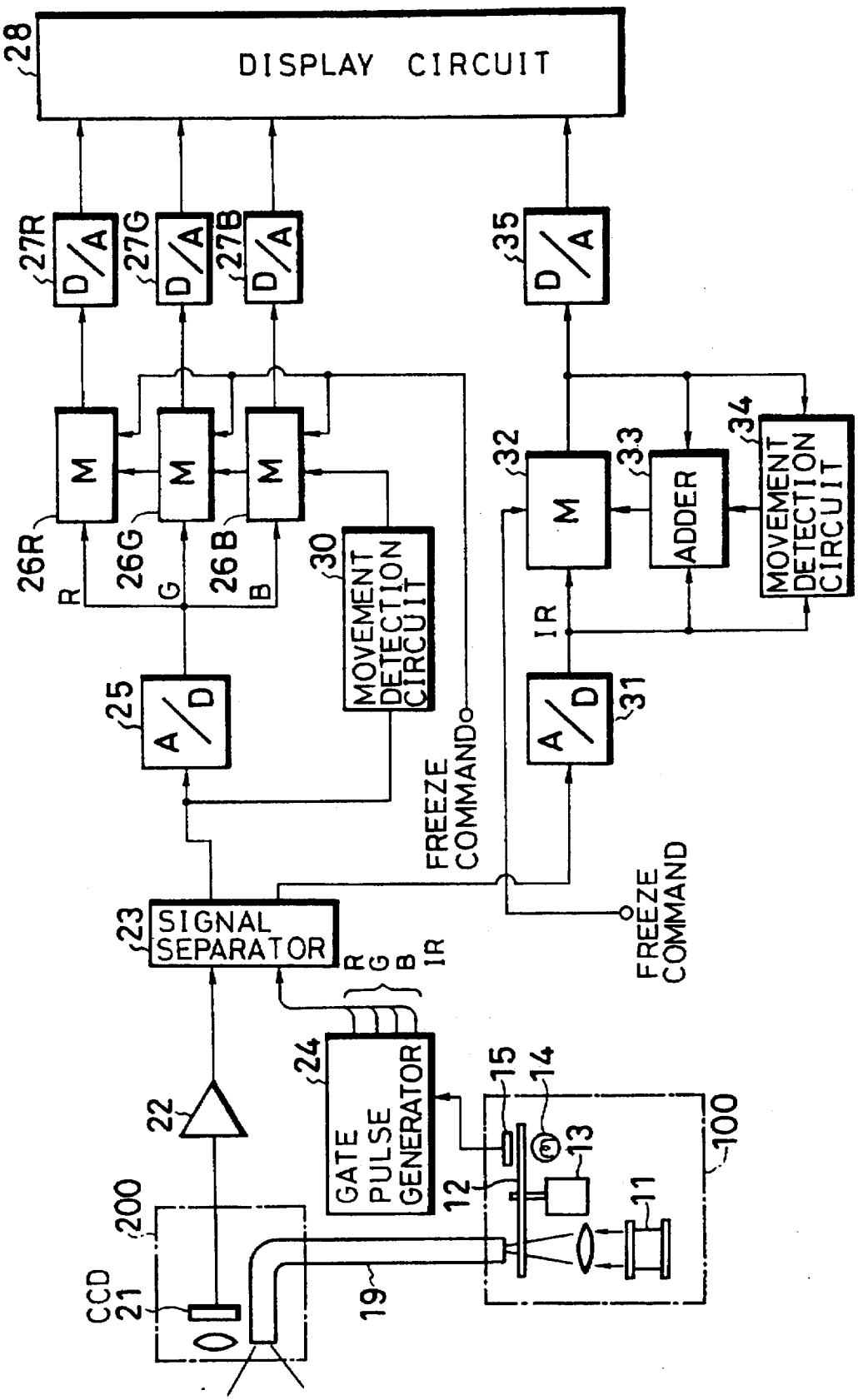
FIG. 1 is a block diagram of the structure of an embodiment of a field sequential image pickup apparatus (electronic endoscope apparatus)

FIG. 1 shows the structure of an embodiment of an field sequential image pickup apparatus, and FIG. 2 shows the structure of a color disk thereof. In FIG. 1, a light source device 100 is provided therein with a light source lamp 11, a color disk 12, and a motor 13 for driving the color disk 12. A lamp 14 and a photosensor 15 are disposed opposite to each other with the color disk 12 therebetween. Filters 16R, 16G, 16B for R (red), G (green) and B (blue) light beams, respectively, and an infrared filter 16IR for infrared (IR) light, near infrared light in this embodiment, are attached to the color disk 12, as shown in FIG. 2. A slit portion 17 is provided on the inside of the filters 16 so as to discriminate the types of the filters 16 by the number of slits. That is the type of a rotating filter 16 is detected by judging the number of slits by the photosensor 15. The color disk 12 can sequentially output R, G, B and infrared light beams from the light source device 100 for every field.

As shown in FIG. 1, a light guide 19 is optically connected to the light source device 100 and it is extended toward the forward end portion of an electronic endoscope 200. A CCD 21 as a solid-state image sensor is provided within the electronic endoscope 200, and the image of an object of observation is picked up by the CCD 21. The electronic endoscope 200 and the light source device 100 are connected to an external processor device, and the other circuits shown in FIG. 1 are provided in the external processor device.

A signal separator 23 is connected to the CCD 21 via a preamplifier 22, and a gate pulse generator 24 for inputting a detection signal from the photosensor 15 of the light source device 100 is provided. The gate pulse generator 24 generates RGB gate pulses for extracting (sampling) the RGB signals and the IR signals, and the signal separator 23 separates and extracts predetermined signals from the picture signals input from the preamplifier 22 on the basis of the gate pulses. Memories 26R, 26G and 26B for storing the R, G and B signals, respectively, which constitute a visible image are connected to one output side of the signal separator 23 via an A/D converter 25, and a display circuit 28 is connected to the memories 26R, 26G and 26B through D/A converters 27R, 27G and 27B, respectively.

A freeze command signal is supplied to the memories 26R, 26G and 26B by the operation of a freeze button (not shown), and in accordance with the freeze command the writing/reading operation of a picture signal is suppressed so as to execute a freeze operation. A movement detection circuit 30 for inputting the outputs of the signal separator 23 is provided. The movement detection circuit 30 compares image information signals so as to detect a movement in an object of observation, and when the movement detection circuit 30 detects a movement, it outputs a signal indicating that there is a movement to the memories 26R, 26G and 26B. If a freeze command signal is input to the memories 26R, 26G and 26B when there is a movement, they inhibit the freeze operation, while executing the freeze operation only when there is no movement.

To the other output side of the signal separator 23 are connected a memory 32 for storing an infrared (IR) picture signal, an adder 33 as a noise reducer and a movement detection circuit 34 via an A/D converter 31. The memory 32 is connected to the display circuit 28 via a D/A converter 35. The movement detection circuit 34 detects a movement in an object of observation by comparing the image information signals output from the A/D converter 31, and outputs a signal which corresponds to the degree of movement to the adder 33.

The adder 33 suspends the adding operation when there is a movement, more strictly, when the degree of movement reaches a predetermined value, and executes the adding operation when there is no movement, more strictly, when the degree of movement is less than a predetermined value. In this manner, when it is judged that there is no movement, the adder 33 executes the adding operation while weighting in accordance with the result of comparison of the image information signals (in accordance with the degree of misregistration) in the same way as a known noise reducer, thereby reducing noise.

The display circuit 28 conducts outputting processing to a monitor connected thereto, and uses an encoder or the like with respect to a visible image. A picture signal processing circuit (not shown) for executing processing such as gamma correction and white balance control is provided in an appropriate position in the circuit shown in FIG. 1.

The operation of the embodiment having the above-described structure will now be explained with reference to FIG. 3. The color disk 12 of the light source device 100 shown in FIG. 1 is first rotated, and R, G, B and IR light beams are sequentially projected from the filter 16 shown in FIG. 2 onto an object of observation through the light guide 16. The CCD 21 thus picks up the image of the object of observation. At this time, a vertical driving (VD) signal is used in order to obtain a picture signal for one field, as shown in FIG. 3(A), and while the color disk 12 is rotated, a slit signal shown in FIG. 3(B) is detected by the photosensor 15 for each field. The outputs of the photosensor 15 are supplied to the gate pulse generator 24, which generates an R gate signal, G gate signal, B gate signal and IR gate signal shown in FIGS. 3(C) to 3(F). The signal separator 23 at the subsequent stage extracts and separates R signals, G signals and B signals shown in FIG. 3(G) and infrared (IR) signals shown in FIG. 3(H) from the picture signals output from the CCD 21 on the basis of these gate signals. Accordingly, one infrared signal is obtained for every four fields (4n fields (n:integer)).

The R, G and B signals are temporarily stored in the memories 26R, 26G and 26B, respectively, via the A/D converter 25 so as to generate a simultaneous color image. At the same time, the movement detection circuit 30 detects a movement of the object of observation (image) on the basis of the R, G and B signals. As described above, when it is judged that there is a movement, the freeze operation is inhibited. Therefore, even if a freeze command is issued to the memories 26R, 26G and 26B, the freeze operation is suspended when there is a movement, and it is resumed at the point of time when there is no movement. When the freeze operation is executed, the image information signals stored in the memories 26R, 26G and 26B are read out at that point of time. These picture signals are supplied to the display circuit 28, and the freeze (still) image of the object of observation is displayed on the monitor in colors.

The IR picture signals separated by the signal separator 23 are temporarily stored in the memory 32 via the A/D converter 31 and they are simultaneously supplied to the adder 33 and the movement detection circuit 34. When the movement detection circuit 34 judges that there is a movement, the noise reducing operation by the adder 33 is suppressed in accordance with the quantity of movement, and the picture signals stored in the memory 32 are processed so as to display an infrared image. On the other hand, when it is judged that there is no movement, the adder 33 resumes the noise reducing operation fully, adds the picture signals while weighting in accordance with the movement of pictures (degree of a small movement), thereby reducing noise. When a freeze command is issued, the image information stored in the memory 32 is displayed on the monitor in monochrome at that point of time. That is, in the case of an infrared image, the information at the point of time when a freeze command is issued is certainly displayed on the monitor as a freeze (still) image, so that it is possible to record the desired state of the object without missing a shutter chance. In addition, when there is no movement in the object, it is possible to improve the S/N so as to prevent the display of an obscure picture.

Although two movement detection circuits 30, 34 are provided in this embodiment, it is possible to use only one movement detection circuit in common.

As explained above, according to the present invention, it is possible to prevent a visible freeze image from generating misregistration in color picture when there is a movement in the object of observation. With respect to an infrared image, it is possible to display a freeze image without missing a shutter chance irrespective of a movement in an object of observation and it is possible to improve the S/N to display a clear image when there is no movement. As a result, it is possible to observe more accurately, for example, the state of a mucoepidermoid portion in the body by a visible image and submucous blood flow by an infrared image.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A field sequential image pickup apparatus comprising:
   a light source device provided with a color disk which has filters for visible light and a filter for infrared light;
   a signal processing circuit for sequentially generating visible picture signals and infrared picture signals from a solid-state image sensor in synchronism with the rotation of each of said filters for visible light and said filter for infrared light;
   a movement detection circuit for detecting a movement of an object of observation from visible picture signals supplied from said signal processing circuit;
   a movement detection circuit for detecting a movement of an object of observation from infrared picture signals supplied from said signal processing circuit;
   a freeze operation circuit for executing a freeze operation with respect to said visible picture signals in accordance with said movement of said object, said freeze operation circuit for said visible picture signals inhibiting said freeze operation when a movement of said object is detected by said movement detection circuit for visible picture signals, while executing said freeze operation when no movement is detected; and
   a noise reducing circuit for executing a noise reducing operation with respect to said infrared picture signals;
   and a freeze operation circuit for executing a freeze operation with respect to said infrared picture signal and which suppresses said noise reduction operation when movement of said object is detected by the movement detection circuit for the infrared picture signals for every turn of said color disk, and which fully executes said noise reduction operation when no movement is detected.

2. A field sequential image pickup apparatus according to claim 1, wherein said color disk comprises red, green, blue and infrared filters.

3. A field sequential image pickup apparatus comprising:
   a light source device including a color disk provided with filters for visible light and a filter for infrared light so as to sequentially output visible light and infrared light by a rotating operation, and a detection sensor for detecting a rotation of said color disk;
   a solid-state image sensor for picking up an image of a body cavity as an object of observation at the time of projection of said visible light and said infrared light;
   a gate pulse generating circuit for generating gate pulses for extracting visible picture signals and infrared picture signals on the basis of outputs of said detection sensor;
   a signal separation circuit for separating said visible picture signals and said infrared picture signals from outputs of said solid-state image sensor on the basis of said gate pulses output from said gate pulse generating circuit;
   a movement detection circuit for detecting a movement of said object of observation from said visible picture signals output from said signal separation circuit;
   a movement detection circuit for detecting a movement of said object of observation from said infrared picture signals output from said signal separation circuit every turn of said color disk;
   a freeze operation circuit for inhibiting a freeze operation with respect to said visible picture signals if a movement of said object is detected by said movement detecting circuit for said visible picture signals, while executing said freeze operation if no movement is detected, when a freeze command is issued;
   a noise reducing circuit for suppressing a noise reducing operation for said infrared picture signals;
   and a freeze operation circuit for executing a freeze operation with respect to said infrared picture signals and which suppresses said noise reducing operation when movement of said object is detected in accordance with the quantity of movement by the movement detection circuit for said infrared picture signals, and which fully executes said noise reducing operation when no movement is detected.

* * * * *